United States Patent
Ramachandran (10) Patent No.: US 9,015,854 B2
(45) Date of Patent: Apr. 21, 2015

(54) ACCESS RIGHTS MANAGEMENT IN ENTERPRISE DIGITAL RIGHTS MANAGEMENT SYSTEMS

(75) Inventor: Arun Ramachandran, Chennai (IN)

(73) Assignee: Tata Consultancy Services, Mumbai (IN)

( * ) Notice: Subject to any disclaimer, the term of this patent is extended or adjusted under 35 U.S.C. 154(b) by 559 days.

(21) Appl. No.: 13/328,876

(22) Filed: Dec. 16, 2011

(65) Prior Publication Data

US 2013/0036475 A1    Feb. 7, 2013

(30) Foreign Application Priority Data

Aug. 2, 2011   (IN) .......................... 2192/MUM/2011

(51) Int. Cl.
| | | |
|---|---|---|
| *G06F 21/62* | (2013.01) | |
| *G06F 21/45* | (2013.01) | |
| *H04L 12/58* | (2006.01) | |
| *H04L 29/06* | (2006.01) | |

(52) U.S. Cl.
CPC .............. *G06F 21/6209* (2013.01); *H04L 51/24* (2013.01); *G06F 21/45* (2013.01); *H04L 51/22* (2013.01); *H04L 63/10* (2013.01)

(58) Field of Classification Search
CPC .................. G06F 21/00–21/105; G06F 21/30; G06F 21/31; G06F 21/45; G06F 21/60; G06F 21/604; G06F 21/62–21/6218; G06F 21/78; G06F 2221/2107; G06F 2221/2113; G06F 2221/2115; G06F 2221/2141; G06F 2221/2147; H04L 9/088; H04L 9/0894; H04L 9/32; H04L 9/321; H04L 2209/60; H04L 2209/603; H04L 63/062; H04L 63/08; H04L 63/10; H04L 2463/101; H04L 67/1002; H04L 51/00; H04L 51/22; H04L 51/24
USPC .............. 726/2–4, 26–28; 713/182, 189, 193; 380/277–278; 707/608, 705, 781, 707/783–785
See application file for complete search history.

(56) References Cited

U.S. PATENT DOCUMENTS

| | | | | |
|---|---|---|---|---|
| 6,961,849 | B1 * | 11/2005 | Davis et al. .................... | 713/167 |
| 7,213,249 | B2 * | 5/2007 | Tung Loo et al. .............. | 719/330 |
| 7,480,715 | B1 * | 1/2009 | Barker et al. .................. | 709/224 |
| 7,577,838 | B1 * | 8/2009 | Rossmann ...................... | 713/165 |
| 7,672,853 | B2 * | 3/2010 | Gune et al. ...................... | 705/1.1 |
| 7,730,543 | B1 * | 6/2010 | Nath ................................ | 726/27 |
| 7,818,789 | B2 * | 10/2010 | Beilinson et al. ................. | 726/4 |
| 7,912,971 | B1 * | 3/2011 | Dunn ............................. | 709/229 |
| 8,473,318 | B2 * | 6/2013 | Nielson et al. ............... | 705/7.11 |

(Continued)

FOREIGN PATENT DOCUMENTS

WO    WO 2004034184 A2 *    4/2004

*Primary Examiner* — Saleh Najjar
*Assistant Examiner* — Eric W Shepperd
(74) *Attorney, Agent, or Firm* — Lee & Hayes, PLLC (57) ABSTRACT

Systems and methods for obtaining access rights to an encrypted document are described. The method comprises receiving a request for obtaining access rights to the encrypted document from a requestor, through an eDRM interface. The method further comprises generating a request inbox corresponding to a granter of the encrypted document. The request inbox contains at least the request received from the requestor. The generated request inbox is sent to the granter through the eDRM interface. The method furthermore comprises obtaining a response to the request from the granter, and providing a status alert indicative of the response to the requestor through the eDRM interface.

12 Claims, 6 Drawing Sheets

(56) References Cited

U.S. PATENT DOCUMENTS

| | | | |
|---|---|---|---|
| 8,776,216 B2* | 7/2014 | Boccon-Gibod et al. | 726/21 |
| 2003/0066884 A1* | 4/2003 | Reddy et al. | 235/382.5 |
| 2007/0038765 A1* | 2/2007 | Dunn | 709/229 |
| 2007/0067836 A1* | 3/2007 | Busboom et al. | 726/10 |
| 2008/0005024 A1* | 1/2008 | Kirkwood | 705/50 |
| 2008/0127310 A1* | 5/2008 | Robbins et al. | 726/4 |
| 2009/0100060 A1* | 4/2009 | Livnat et al. | 707/9 |
| 2009/0265278 A1* | 10/2009 | Wang et al. | 705/54 |
| 2010/0217643 A1* | 8/2010 | Legath | 705/8 |
| 2010/0250926 A1* | 9/2010 | Ji et al. | 713/165 |
| 2011/0072264 A1* | 3/2011 | McNulty | 713/168 |
| 2011/0082780 A1* | 4/2011 | Nagaram et al. | 705/35 |
| 2011/0296199 A1* | 12/2011 | Kinghorn et al. | 713/189 |
| 2012/0011567 A1* | 1/2012 | Cronk et al. | 726/4 |
| 2012/0136749 A1* | 5/2012 | Hu et al. | 705/26.5 |
| 2012/0255026 A1* | 10/2012 | Baca et al. | 726/26 |
| 2013/0014286 A1* | 1/2013 | Falk et al. | 726/30 |

\* cited by examiner

ACCESS RIGHTS MANAGEMENT IN ENTERPRISE DIGITAL RIGHTS MANAGEMENT SYSTEMS

TECHNICAL FIELD

The present subject matter described herein, in general, relates to access rights management in enterprise digital rights management systems and, in particular, relates to systems and methods for obtaining access rights to an encrypted document using enterprise digital rights management system.

BACKGROUND

Various enterprise digital rights management (eDRM) techniques for protecting documents within an enterprise (also referred as to enterprise documents) are known. It is well appreciated that the enterprise documents may contain confidential information, such as product overviews, marketing plans, customer lists, and sales reports in a digital format. In order to protect such enterprise documents from unauthorized usage, enterprises generally employ eDRM systems based on the eDRM techniques. The eDRM systems facilitates encrypting the enterprise documents and assigning one or more access rights, such as an open right, an edit right, a copy right, and a print right, for users within the enterprise. Further, the eDRM systems facilitate enforcing such access rights to ensure that the enterprise documents are to be used only by authorized users.

Thus, the eDRM systems restrict access to the encrypted enterprise documents to only those users who have the access rights as assigned by a granter. The granter may be, for example, owner of the enterprise document. In certain cases, the granter may assign access rights to an individual user or a group of users based on various functional groups or teams the users belong to or projects in which the users are involved. In other cases, users desiring access to any of these encrypted documents may contact the granter of the encrypted document for requesting the access rights. In general, the users contact the granter via email communications, telephonic conversations, fax communication, etc. The granter may then choose to grant or deny the requested access rights. Based on the access rights granted to the users, the users' access to the encrypted enterprise documents is controlled by the eDRM systems. Thus, eDRM systems allow only users having corresponding access rights to access the encrypted enterprise documents ensuring that the enterprise documents are secured.

SUMMARY

This summary is provided to introduce concepts related to systems and methods for obtaining access rights to an encrypted document and the concepts are further described below in the detailed description. This summary is not intended to identify essential features of the claimed subject matter nor is it intended for use in determining or limiting the scope of the claimed subject matter.

In one implementation, a method for obtaining access rights to an encrypted document using an enterprise digital rights management (eDRM) system is described. The method comprises receiving a request for obtaining access rights to the encrypted document from a requestor, through an eDRM interface. The method further comprises generating a request inbox corresponding to a granter of the encrypted document. The request inbox contains at least the request received from the requestor. The generated request inbox is sent to the granter through the eDRM interface. The method furthermore comprises obtaining a response to the request from the granter, and providing a status alert indicative of the response to the requestor through the eDRM interface.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Conventional techniques of requesting access rights to an encrypted enterprise document, i.e., an enterprise document encrypted by an enterprise digital rights management (eDRM) system involves contacting a granter of the encrypted document via traditional modes of communication including email communications, telephonic conversations, and fax communication, and requesting the granter for the type of access rights required by the requestor. For example, a requestor may write an email to the granter requesting open, edit and copy access rights on a XYZ encrypted enterprise document. The requestor and the granter are amongst a plurality of users within the enterprise. Upon receiving the request, the granter may either choose to grant one or more of the requested access rights to the requestor or refuse to grant the requested access rights altogether. The granter communicates response to the request via the same traditional modes of communication. For example, the granter may reply to the requestor via email for communicating response to the requestor's request.

Such conventional techniques of requesting access rights via the traditional modes of communication make tracking of the request and response difficult for an enterprise. For example, a requestor A may request a granter B for access rights via email. Further, another requestor, say, a requestor C may request a granter D for access rights via telephonic conversation. The requestors may opt to contact the granter, via different traditional modes of communication according to their convenience or choice. Referring to the above example, for tracking all the requests and responses, the enterprise may have to monitor all the email communication between the requestor A and the granter B, and the telephonic conversation between the requestor C and the granter D. Such monitoring of different traditional modes of communication, results in wastage of time and resources of the enterprise.

Further, if the communications between the requestors and the granters is via their personal mobile phones or email addresses, then tracking such communications are practically not feasible for the enterprise. Thus, not all the requests and responses can be tracked using the conventional techniques of requesting access rights. Further, such conventional techniques of requesting access rights are unorganized, as communication process between the requestors and the granters are scattered among a plurality of traditional modes of communication.

In accordance with the present subject matter, systems and methods for obtaining access rights to the encrypted document are described. The systems and methods involves requesting access rights and receiving a response to the request using an eDRM system, thereby simplifying the process of requesting access rights and enabling easy monitoring of every request and response initiated using the eDRM system.

The eDRM system includes a plurality of client devices connected to an eDRM server via a network. In one implementation, each of the client devices may be equipped with an eDRM interface. The eDRM interface may be, for example, a secured interface of an eDRM application installed on the client devices. Alternatively, the eDRM interface may be a secured interface of an eDRM application hosted on the eDRM server. A plurality of users may use the client devices to interact with the eDRM interface for various purposes including, but not limited to, encrypting documents within the enterprise (hereinafter referred as encrypted documents), viewing the encrypted documents, making a request for access rights to the encrypted documents, and receiving a response corresponding to the request.

In the context of a particular encrypted document, the users may be categorized into requestors and granters. A requestor may be understood as a user requesting for access rights to the encrypted document, and a granter may be understood as a user having authority to grant or deny the requested access rights. In one implementation, the granter may be an owner or author of the encrypted document. In another implementation, the granter may be a temporary owner or a rights secretary having the authority to grant access rights as assigned by the owner. It is to be understood that in the context of one encrypted document there can be more than one granters having authority to grant access rights to one or more.

In one implementation, the requestor may initiate a request for obtaining access rights to the encrypted document using the eDRM interface. The eDRM server receives the request initiated by the requestor and subsequently stores the request in a request database associated with the eDRM server. The request database stores data, for example, in form of a plurality of records. The data may include a list of encrypted documents, document details, access rights details, and granter details corresponding to the encrypted documents. The document details include, for example, document name, document ID and document location. The access rights details include, for example, type of access rights assigned to various users within the enterprise corresponding to the encrypted documents. The granter details include, for example, granter name and granter ID. It will be appreciated that data in the request database may be periodically updated, in response to any editing, deletion, and addition made to the data by different users within the enterprise. Thus, the request database, at any time, reflects the most recent data.

In one implementation, whenever a granter is connected to the eDRM server through the network, i.e., when the granter is online, the eDRM server determines the requests pending for authorization from the granter, amongst a plurality of requests in the request database. Based on the determination, the eDRM server generates a request inbox for the granter. The request inbox contains pending requests requiring authorization from the granter. In one implementation, the eDRM server generates the request inbox when a prompt for the request inbox is received from the granter through the eDRM interface. For example, the eDRM interface may include a request inbox tab. When the granter clicks on the request inbox tab, the eDRM server is prompted for the request inbox. In said implementation, such prompts may be generated from the eDRM interface periodically. In another implementation, the eDRM server may be configured to automatically generate the request inbox at predetermined time intervals, irrespective of whether a prompt is received from the server or not. The eDRM server then generates the request inbox for the granter. The generated request inbox is displayed to the granter on the eDRM interface.

The granter may then respond to the requests in the request inbox. For example, the granter may grant the requests, deny the requests, or grant the requests with some modifications. The eDRM server receives the response to each request from the granter, and provides the response to the corresponding requestor in the form of status alert. The status alert, for example, indicates to the requestor whether the granter has granted the request or denied the request. Further, the eDRM server may store a copy of the response in the request database for monitoring purposes.

In one implementation, the eDRM server monitors each request initiated by the requestor and each response obtained by the requestor from the request database, to identify behavioral risk associated with the requestor. In said implementation, the eDRM server is configured to monitor requests and responses corresponding to each requestor. Consider a situation where a requestor is actively sending access requests for a number of encrypted documents, or almost every access request made by a requestor is being rejected by granters. In such a situation, a requestor may be identified as a suspicious individual who may pose a risk to maintaining confidentiality of enterprise information. For example, the suspicious individual may misuse confidential information contained within the encrypted documents, if an access right is granted to him. The enterprise may therefore question the activities of the suspicious individual to prevent any risk associated therewith. In case the suspicious individual is found to be reliable, the eDRM server may suggest an administrator or the granter to provide the requested access rights to the suspicious individual in order to avoid repeated requests initiation by the suspicious individual.

The systems and methods, in accordance with the present subject matter ease the request communication process between the requestors and the granters by providing a common communication platform to both the requestors and the granters for requesting access rights and communicating the response to the requested access rights respectively. With the common communication platform, the systems and methods enable easy monitoring of each request and response passing through the communication platform to identify any risk to the confidentiality of enterprise information.

These and other advantages of the present subject matter would be described in greater detail in conjunction with the following figures. While aspects of described systems and methods for obtaining access rights to an encrypted document can be implemented in any number of different computing systems, environments, and/or configurations, the embodiments are described in the context of the following exemplary system(s).

Figure 1A:
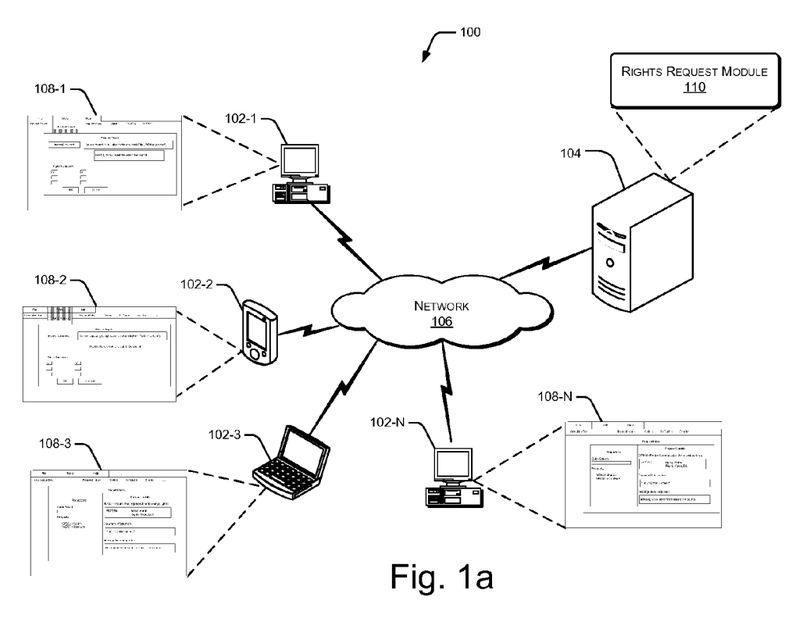
FIG. 1a illustrates a network implementation of an enterprise digital rights management (eDRM) system, in accordance with an embodiment of the present subject matter.

FIG. 1a illustrates a network implementation of an eDRM system 100, in accordance with an embodiment of the present subject matter.

In one implementation, the eDRM system 100 comprises a plurality of client devices 102-1, 102-2, 102-3, . . . 102-N connected to an eDRM server 104, through a network 106. For the sake of clarity, the client devices 102-1, 102-2, 102-3, . . . 102-N are collectively referred to as the client devices 102 and individually referred to as a client device 102.

The client devices 102 may include, without limitation, desktop computers, laptops or other portable computing devices, and network computing devices.

The eDRM server 104 may be implemented in a variety of computing systems, such as a laptop computer, a desktop computer, a notebook, a workstation, and a mainframe computer.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices.

In an implementation, the client devices 102 are connected to the eDRM server 104 via the network 106. The client devices are equipped with corresponding eDRM interfaces 108-1, 108-2, 108-3, . . . 108-N. For the sake of clarity, the eDRM interfaces 108-1, 108-2, 108-3, . . . 108-N are collectively referred as the eDRM interface 108 and individually referred as an eDRM interface 108.

The eDRM interface 108 enables the users including the requestors and the granters, to communicate with the eDRM server 104 for encrypting the enterprise documents, requesting access rights to the encrypted documents, responding to the request pertaining to access rights, and obtaining response to the request, and like.

For obtaining access rights to an encrypted document, the requestor may use the eDRM interface 108 to make a request for obtaining access rights to an encrypted document. In one implementation, the eDRM server 104 includes a rights request module 110 for receiving the request initiated by the requestor. The request may contain, for example, document details and type(s) of access rights. The document details include, for example, document name and document identifier (ID). The type(s) of access rights indicates one or more access rights requested by the requestor, for example, open, edit, copy and print access rights. Additionally, the request may also contain granter details, for example, name and/or ID of the granter.

Upon receiving the request from the requestor, the rights request module 110 stores the request in a request database. The request database may be either an internal repository or an external repository associated with the eDRM server 104. In addition to the request, the request database includes data, such as a list of encrypted documents, document details, access rights details including current status of the access rights and the granter details corresponding to the encrypted documents. In said implementation, the data in the request database represents the most recent data. Based on the data in the request database, the rights request module 110 generates a request inbox for a granter. In one implementation, the rights request module 110 generates the request inbox when a prompt is received from the granter, through the eDRM interface. Such a prompt may be received periodically.

For generating the request inbox, the rights request module 110 determines the requests corresponding to the granter from amongst a plurality of requests in the request database. The requests corresponding to the granter may be understood as requests pending for authorization from the granter of the encrypted document. Upon determination, the rights request module 110 stores the requests in the request inbox. The rights request module 110 then sends the generated request inbox to the granter, through the eDRM interface 108. For example, the request inbox is displayed to the granter on the eDRM interface 108. The granter may then respond to the requests in the request inbox, i.e., the granter may either grant one or more of the requested access rights or the granter may not to grant any access right to the requestor. The rights request module 110 receives the response corresponding to each request from the granter and provides the response to the corresponding requestor through the eDRM interface 108. In an implementation, the rights request module 110 displays the response to the requestor in the form of status alert on the eDRM interface 108.

In one implementation, the eDRM interface 108 may include a variety of bars or tabs including a tool bar containing access right request tab/option for making the request for access rights to the encrypted document. Further, the eDRM interface 108 may include an information bar containing a request inbox tab for displaying the pending requests awaiting granters' responses. The information bar may also include a granter tab indicating a list of all the granters and encrypted documents on which they have authority to grant access rights. Furthermore, the eDRM interface 108 may include appearance and setting options to alter the appearance of the eDRM interface 108, for example, colors, arrangement of the information bars, tool tab or icon on the eDRM interface 108.

It is to be understood that the eDRM interface 108 is described above with features, such as information bar, the tool bar and different tabs for the purpose of explanation and not as a limitation. Various other tabs or features may also be provided on the eDRM interface 108, and arrangement of different tabs may be varied to ease the request communication process and enhance the look and appeal of the eDRM interface 108 without departing from the scope of the present subject matter.

Figure 1B:
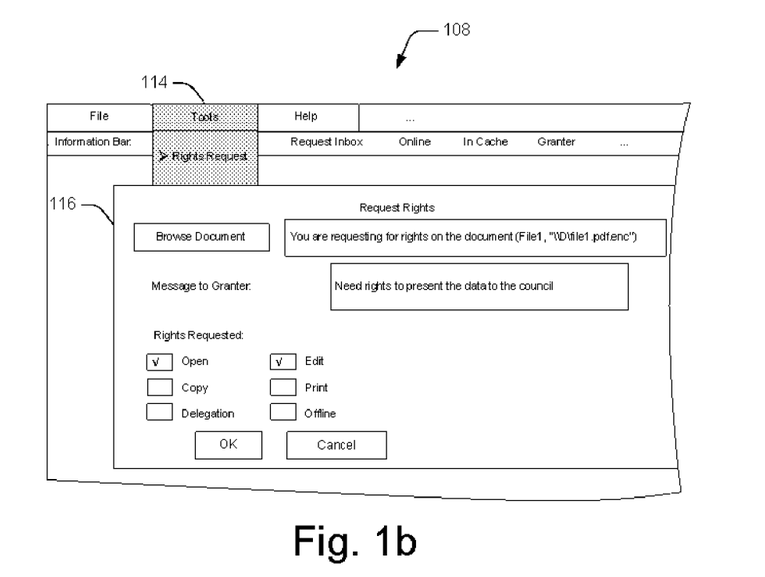
FIG. 1b-1e illustrates eDRM interfaces to communicate with an eDRM server, in accordance with an embodiment of the present subject matter.

FIG. 1b-1e illustrates eDRM interfaces 108 to communicate with an eDRM server 104, in accordance with an embodiment of the present subject matter. As described previously, the requestor may use the client devices 102 to access the eDRM interface 108. As shown in FIG. 1b, the eDRM interface 108 may include a tool tab 114 containing various options including rights request option for requesting access rights to an encrypted document. For requesting the access rights to the encrypted document, the requestor can click on the request rights option. In response to the click action performed by the requestor, a request rights window 116 is displayed to the requestor on the eDRM interface 108.

The request rights window 116 may include a browse document tab for browsing the encrypted document on which access rights are desired. Once the requestor browses and selects the encrypted document, the request rights window 116 automatically displays the document details thereon. For example, the rights request module 110 within the eDRM server 104 may be configured to retrieve the document details from the request database when the encrypted document is selected, and may automatically fill the document details in the request rights window 116 when the requestor selects the encrypted document. As shown in FIG. 1b, the request rights window 116 may automatically fill the document details, i.e., document location 'File1' and document name '\\D\file1.pdf' in the form of a customized message 'you are requesting for rights on the file (File, \\D\file1.pdf)'.

The requestor may thereafter choose access rights from amongst a list of access rights displayed in the request rights window 116. For example, the requestor may select open and edit access right amongst the list of access rights. Further, the request rights window 116 may include a message field, where the requestor may leave a custom message for the granter. For example, the requestor may specify the purpose for which access rights are required. As shown in FIG. 1b, the requestor may specify the purpose as 'needs rights to present the data to the council'. Once the request rights window 116 is filled, the requestor may click on OK to send the request to the granter. The rights request module 110 subsequently receives the request and stores the request in the request database.

Figure 1C:
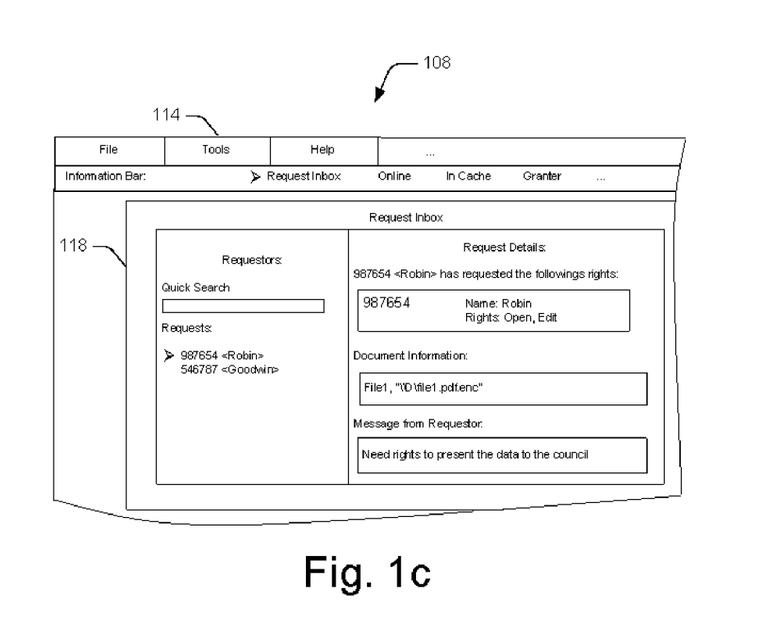

Based on the request stored in the request database, the rights request module 110 generates a request inbox corresponding to the granter, for example, when a prompt is received from the corresponding granter through the eDRM interface 108. The rights request module 110 sends the generated request inbox to the granter, where the request inbox is displayed to the granter on the eDRM interface 108. As shown in the FIG. 1c, the eDRM interface 108 includes an information bar containing various tabs including a request inbox tab. When the granter clicks on the request inbox tab, the request inbox 118 received from the eDRM server is displayed to the granter. The request inbox 118 contains all the requests initiated by a plurality of requestors that are awaiting the response from the granter. The received requests may indicate document details, requestor details, rights requested, and requestor message. The document details includes, for example, document name and location. The requestor details includes, for example, requestors ID and requestor name. The rights requested may include a list of access rights requested by the requestor, and the requestor message indicates a custom message sent by the requestor, for example, a message specifying the purpose for which access rights are required. As shown in FIG. 1c, requests from the two requestors 'Robin' and 'Kate' are displayed to the granter in the request inbox 118.

Figure 1D:
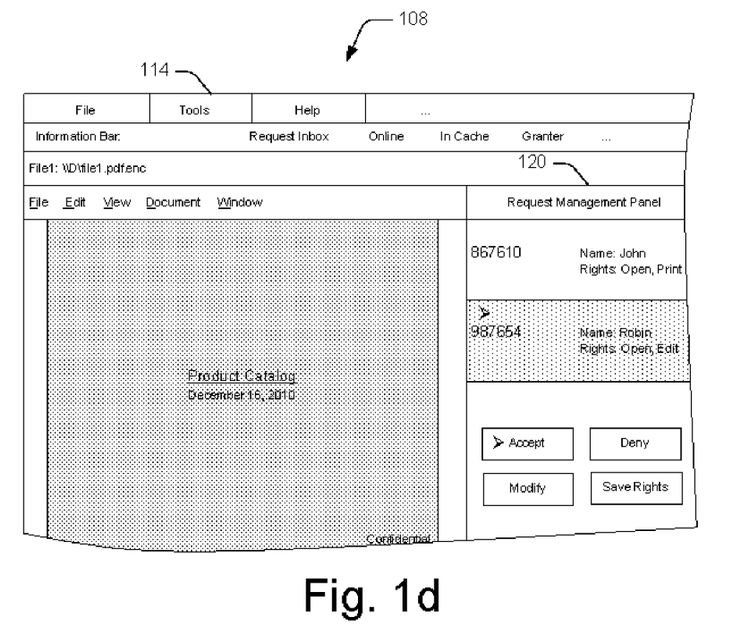

The granter may open the encrypted document to which access rights are requested by the requestors. When the encrypted document is opened, a request management panel 120 is displayed to the granter, as shown in FIG. 1d. The request management panel 120 displays all the currently granted requests on the opened encrypted document along with a pending request displayed with a different color code, in order to differentiate the pending request from the granted requests. It is well appreciated that the request management panel 120 with currently granted requests and pending requests, if any, will be displayed to the user, whenever the granter opens the corresponding encrypted document, irrespective of the fact that the granter has viewed the pending requests in the request inbox or not.

The granter may select the pending request and respond to the pending request. For example, the granter may grant or deny all the requested access rights, or the granter may modify the access rights requested by the requestor, i.e., the granter may delete some of the access rights and grant rest of the access rights to the requestor. As shown in FIG. 1d, upon viewing the pending request received from the requestor 'Robin' requesting open and edit access rights, the granter responds to the request by granting all the request access rights to the requestor.

Figure 1E:
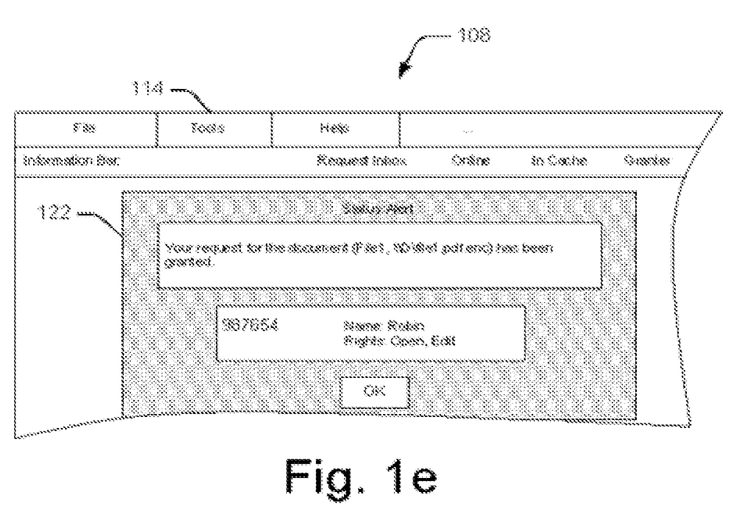

The response of the granter is received by the request rights module 110 that provides the response of the granter to the requestor 'Robin' through the eDRM interface 108. As shown in FIG. 1e, the response is displayed to the requestor in form of status alert 122. The status alert 122 disappears from the eDRM interface 108 when the requestor clicks on OK.

Figure 2:
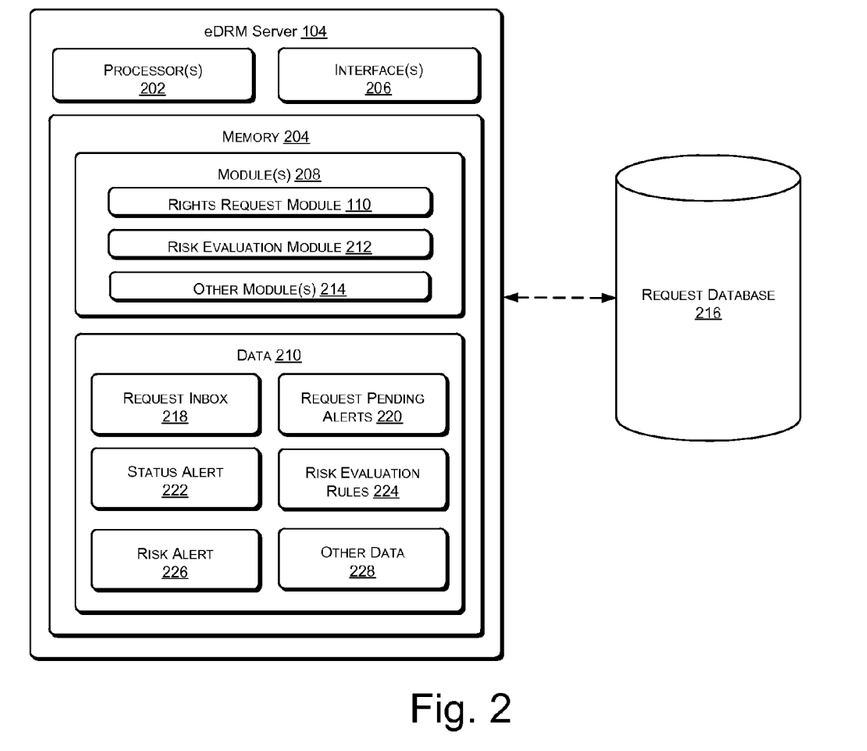
FIG. 2 illustrates components of an eDRM server, in accordance with an embodiment of the present subject matter.

FIG. 2 illustrates components of an eDRM server 104, according to an embodiment of the present subject matter. In said embodiment, the eDRM server 104 includes one or more processor(s) 202, a memory 204 coupled to the processor 202, and interface(s) 206.

The processor 202 can be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The interface(s) 206 may include a variety of software and hardware interfaces, for example, a web interface, a graphical user interface, allowing the eDRM server 104 to interact with the user devices 102. Further, the interface(s) 206 may enable the eDRM server 104 to communicate with other computing devices, such as web servers and external data servers (not shown in figure). The interface(s) 206 can facilitate multiple communications within a wide variety of networks and protocol types, including wired networks, for example LAN, cable, and wireless networks such as WLAN, cellular, or satellite. The interface(s) 206 may include one or more ports for connecting the eDRM server 104 to a number of other devices to or to another server.

The memory 204 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 204 includes modules 208 and data 210.

The modules 208 include routines, programs, objects, components, data structures, etc., which perform particular tasks or implement particular abstract data types. In one implementation, the modules 208 include the rights request module 110, a risk evaluation module 212, and other modules 214. The other module(s) 214 may include programs or coded instructions that supplement applications and functions of the eDRM server 104.

The data 210, amongst other things, serves as a repository for storing data processed, received, and generated by one or more of the module(s) 208. The data 210 includes request inbox 218, request pending alerts 220, status alert 222, risk evaluation rules 224, risk alert 226, and other data 228. The other data 228 includes data generated as a result of the execution of one or more modules in the other module(s) 214.

In accordance with the present subject matter, the rights request module 110 within the eDRM server 104 receives request for obtaining access rights from the requestor, through the eDRM interface (not shown in the figure). As described previously, the request may contain, for example, document details, granter details, type of access rights requested, and requestor message.

Once the request is received, the rights request module 110 stores the request in a request database 216. Likewise, the requests received from other requestors corresponding to the same encrypted document or other encrypted documents are stored in the request database 216. As described previously, the request database 216 also contains the data, such as list of encrypted documents, document details, granter details access rights details stored therein. It will be appreciated that the data in the request database 216 may be periodically updated, in response to any editing, deletion, and addition to the data by different users within the enterprise. Thus, the request database, at any time, reflects the most recent data. Although the request database 216 is shown as an external repository associated with the eDRM server 104. The request database 216 may also be implemented as an internal repository, i.e., the repository within the eDRM server 104.

In operation, the rights request module 108 generates a request inbox 218 for the granter. In one implementation, the rights request module 108 is configured to generate the request inbox 218 for the granter at a predetermined time interval, for example, every 15 minutes. In another implementation, the rights request module 108 is configured to generate the request inbox 218, when a prompt is received from the granter through the eDRM interface. In said implementation, the eDRM interface may be provided with a request inbox tab. When the granter clicks on the request inbox tab, the eDRM server 108 is prompted for the request inbox. In response to the prompt, the rights request module 108 within the eDRM server 104 generates the request inbox 218 for the granter and sends the request inbox 218 to the granter, through the eDRM interface.

For generating the request inbox 218, the rights request module 110 determines the requests corresponding to the granter from amongst the plurality of requests in the request database 216. For example, upon receiving a prompt for generating the request inbox for a granter XYZ, the rights request module 110 scans the request database 216 to determine the requests that require authorization from the granter XYZ. Based on the determination, the rights request module 110 generates the request inbox 218 for the granter.

Further, the rights request module 110 sends the generated request inbox 218 to the granter through the eDRM interface. The request inbox 218, for example, may be displayed to the granter on the eDRM interface. Upon viewing the requests in the request inbox 218, the granter may respond to the requests. For example, the granter may choose to either grant or deny one or more of the access rights requested by the requestor. In one example, a granter B may deny a request initiated by a requestor A for open and edit access rights to the encrypted document XXX. In another example, a granter C may grant only open access right to a requestor D, who requested open, edit and copy access rights to the encrypted document YYY. In yet another example, a granter E may grant all the requested access rights to a requestor F over the encrypted document ZZZ.

It is to be understood that in certain cases there may be more than one granter having authority to grant access rights on the same encrypted document. The granters may include, for example, owner of the encrypted document, temporary owner and rights secretary. In such cases, request for the access rights initiated by the requestor relating to such encrypted document is sent to all the granters in their corresponding request inboxes. If all the granters provide same response to the request, the response is communicated to the corresponding requestor. However, if there is any conflict in the response provided by the granter, the rights request module 110 resolves the conflict based on conflict resolving rules stored within the other data 228. Upon resolving the conflict, the rights request module 110 provides an appropriate response to the requestor. The conflict resolving rules, for example, may include a first wins rule, a least rights wins rule, a most rights wins rule, an owner wins rule and a union rule.

For the sake of clarity, a brief description of the conflict resolving rules is provided as follows—First wins rule: The granter who is first to respond to the request wins, thus, the response of such granter is provided to the requestor and the response from the other granters is refused; Least rights wins: The granter who grants least access rights wins, thus, the response of such granter is provided to the requestor; Most rights wins: The granter who grants maximum access rights wins, thus, the response of such granter is provided to the requestor; Owner wins: The owner/author of the encrypted document wins; and Union: A combination of the response of the granters is communicated to the requestor. For example, if the granter 'A' grants the open access rights, the granter 'B' grants the open and edit access rights, and the granter 'C' grants the open and print access rights, then a combination of all the responses, i.e., the open, edit and print access rights can be provided to the requestor.

It is to be understood that the types of conflict resolving rules has been described above only for the purpose of explanation and not as a limitation. Various other conflict resolving rules can be implemented without deviating from the scope of the present subject matter.

In one implementation, the rights request module 110 is configured to generate request pending alerts 220, which may be displayed to the corresponding granter on the eDRM interface, for example, at a preset time intervals. Such request pending alerts 220 inform the granter of the requests awaiting the granter's response or action. The rights request module 110 generates or initiates the request pending alerts 220 to gain immediate attention of the granter, and to speed up the request communication process.

Once the granter responds to the requests, the rights request module 110 provides the response of the granter to the corresponding requestor through the eDRM interface. In an implementation, the rights request module 110 provides the response in form of a status alert 222, which is displayed to the requestor on the eDRM interface, thereby alerting the requestor of the response given by the granter. The status alert 222 may be, for example, provided in real time, i.e., status alert is provided to the corresponding requestor as soon as it is communicated by the granter without any substantial delay. For example, a status alert 222 indicating that the request of the requestor 'A' has been granted by the granter 'B' with the open and edit access rights to an encrypted document 'XXX', may be provided to the requestor A by the rights request module 108. The rights request module 110, for example, may store a copy of the response within the request database 216 for monitoring purposes.

As described previously, the request database 216 also includes access rights details indicating a list of access rights currently held by each user corresponding to the encrypted documents in the request database 216. Consider a situation, where the requestor already have certain access rights on the encrypted document, and the requestor is granted more access rights on the same encrypted document by the granter. In such a situation, the rights requestor module 110 collates the newly granted access rights with the list of access rights previously held by the requestor, and save the collated access rights to the encrypted document corresponding to the requestor in the request database 216.

In one implementation, the granters may be provided with the provisions on the eDRM interface to ignore repeated requests from the requestor. A repeated request may be understood as a request for the same access rights to the same encrypted document, as indicated in a previously received request. In said implementation, the rights request module 110 is configured to match each request received from the requestor with previously received requests from the same requestor from the request database 216. If a repeated request is found, the right request module 108 ignores the request received from the requestor. The rights request module 110 may also alert the requestor in case of the repeated requests.

The granters, for example, may also be provided with provisions on the eDRM interface to ignore a requestor. In said implementation, upon receiving a request from the requestor, the rights request module 110 identifies the corresponding granter having authority to authorize the request. Further, the rights request module 110 determines whether the requestor is ignored by the granter. If the determination indicates that the requestor is ignored, the rights request module 110 ignores the requestor's request. The rights request module 110 may also alert the requestor about the same.

In an implementation, the risk evaluation module 212 within the eDRM server 104 is configured to monitor every request communication between the requestors and the granters from the requests and responses stored in the request database 216. The risk evaluation module 212 evaluates a risk factor for each requestor, based on such monitoring. For evaluation, the risk evaluation module 212 also refers to a plurality of predefined risk evaluation rules 224. Based on the evaluated risk factor, a risk associated with the requestor on the confidentiality of the enterprise information is determined. The risk factor may be indicated, for example, in form of percentage. The risk evaluation rules 224 may specify criteria for evaluating a risk factor, for example, if 10 different requests initiated by a requestor are rejected by the one or more granters, then the risk factor is evaluated as 5%.

In said implementation, the risk factor may have a predefined threshold associated therewith, for example, 2%. If the risk factor is above the threshold, the risk evaluation module 212 generates a risk alert 226 indicating risk associated with the requestor on the confidentiality of the enterprise information. In the above example, if the risk factor is 5% and the threshold is 2%, then the risk alert 226 may be generated and provided to an administrator or a risk analysis team. The enterprise may therefore take appropriate actions based on the risk alert 226. For example, the enterprise may try to identify the reason behind the risk. The enterprise may also question the requestor or monitor further activities of the requestor.

In yet another implementation, a suggestion module may be implemented in other module(s) 214, which is configured to compare the access rights of the requestor with access rights of a group of requestors from the request database 216. It will be appreciated that the enterprise may categorize the users into various user groups based on the level of the users within the enterprise, various project teams they are involved into, and the like. Such group of users may be assigned similar set of access rights by the granter. If the comparison of the access rights of the requestor matches with the access rights to a group of requestors, the suggestion module may generate a suggestion alert for the administrators and/or granters to add the requestor into the group.

Figure 3:
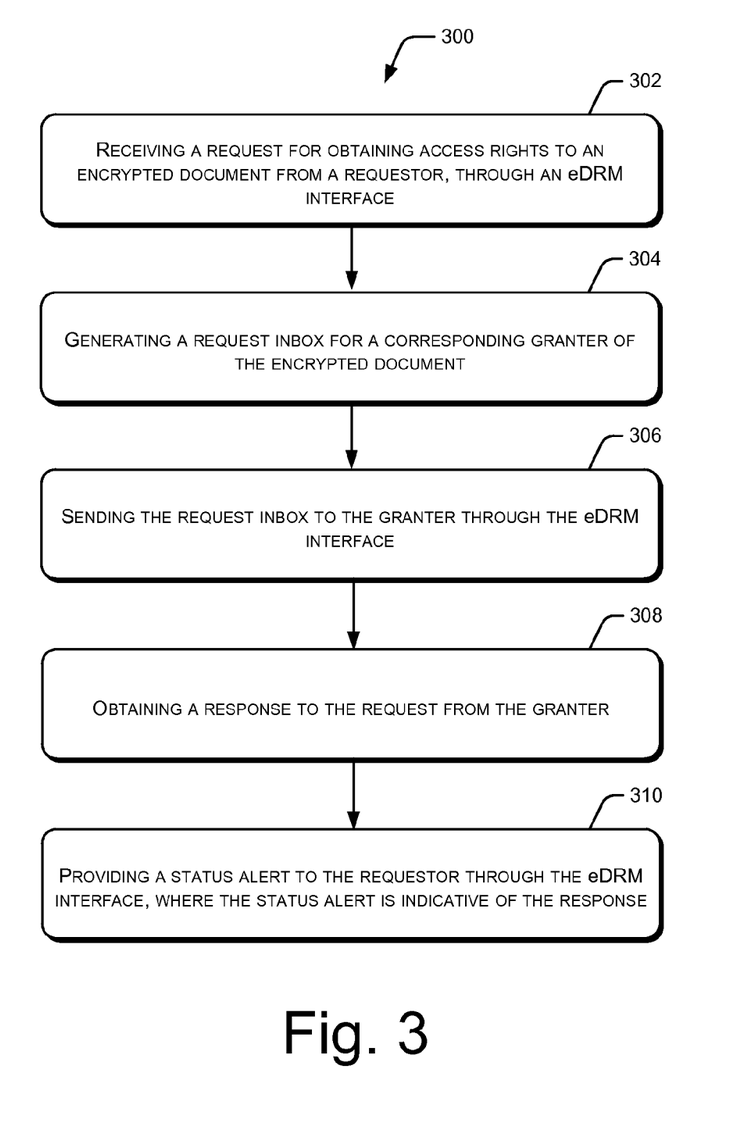
FIG. 3 illustrates a method for obtaining access rights to an encrypted document, in accordance with an embodiment of the present subject matter.
Figure 4:
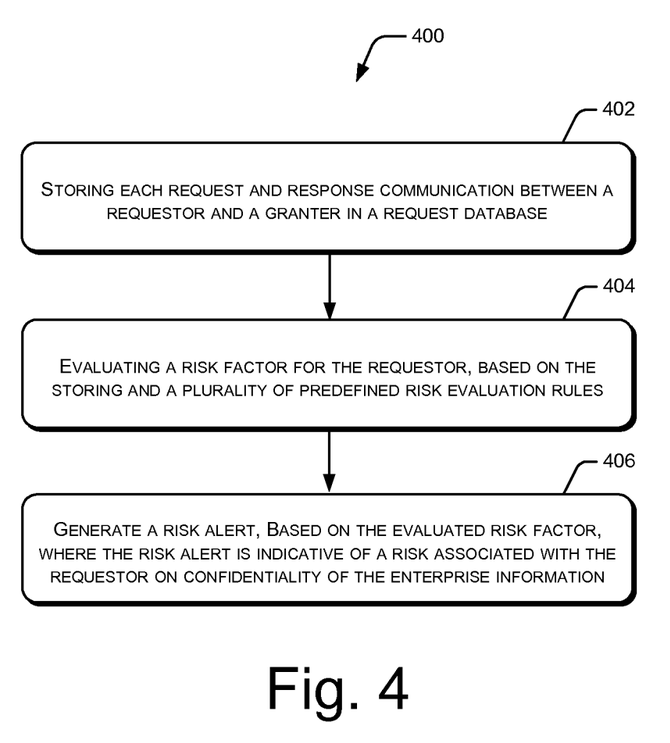
FIG. 4 illustrates a method for evaluating risk on confidentiality of enterprise information, in accordance with an embodiment of the present subject matter.

FIG. 3 illustrates an exemplary method 300 for obtaining access rights to an encrypted document, in accordance with an embodiment of the present subject matter, and FIG. 4 illustrates a method 400 for evaluating risk on confidentiality of the enterprise information, in accordance with an embodiment of the present subject matter. The methods 300 and 400 may be described in the general context of computer executable instructions. Generally, computer executable instructions can include routines, programs, objects, components, data structures, procedures, modules, and functions that perform particular functions or implement particular abstract data types. The methods 300 and 400 may also be practiced in a distributed computing environment where functions are performed by remote processing devices that are linked through a communication network. In a distributed computing environment, computer executable instructions may be located in both local and remote computer storage media, including memory storage devices.

The order in which the methods 300 and 400 are described is not intended to be construed as a limitation, and any number of the described method blocks can be combined in any order to implement the methods 300 and 400, or alternative methods. Additionally, individual blocks may be deleted from the methods 300 and 400 without departing from the spirit and scope of the subject matter described herein. Furthermore, the methods 300 and 400 can be implemented in any suitable hardware, software, firmware, or combination thereof.

Referring to FIG. 3, which illustrates the method 300 for obtaining access rights on an encrypted document, in accordance with an embodiment of the present subject matter, it will be understood that though the method 300 is explained with reference to one request for access rights to one encrypted document, the same method can also be implemented for a plurality of requests for access rights to a plurality of encrypted documents.

At block 302, a request for obtaining access rights to an encrypted document is received from a requestor. In one implementation, the rights request module 110 within the eDRM server 104 receives request for access rights from the requestor through the eDRM interface. The request may include document details, type of access rights requested, and a requestor message. The document details may include document name, document identifier (ID), and document location. The type of access rights requested may include but are not limited to open, edit, copy, print, delegation, and offline access rights.

For the sake of clarity, a brief explanation of different types of access rights is explained as follows—Open access right: An access right that enables the users to open the encrypted document for reading; Edit access right: An access right that enables the users to edit or modify the content within the encrypted document; Copy access right: An access right that enables the user to copy content from the encrypted document and take screen snapshots of the encrypted document; Print access right: An access right that enables the user to print the encrypted document; Delegation access rights: An access right that enables the user to delegate the access rights they are holding to other users within the enterprise; and Offline access rights: An access right that enables the user to access the encrypted document in an offline mode, i.e., when the client devices 102 of the users are disconnected from the eDRM server 104.

At block 304, a request inbox for the corresponding granter of the encrypted document is generated. In operation, the rights request module 110 generates the request inbox 218 for the granter, when the granter is connected to the eDRM server 104 through the network. In one implementation, the rights request module 108 is configured to generate the request inbox 218 for the granter at a predetermined time interval. In another implementation, the rights request module 108 is configured to generate the request inbox 218, when a prompt is received from the granter through the eDRM interface. In said implementation, the eDRM interface may be provided with a request inbox tab. When the granter clicks on the request inbox tab, the eDRM server 108 is prompted for the request inbox. In response to the prompt, the rights request module 108 within the eDRM server 104 generates the request inbox 218 for the granter and sends the request inbox 218 to the granter, through the eDRM interface.

For generating the request inbox 218, the rights request module 110 determines the requests corresponding to the granter from amongst the plurality of requests in the request database 216. Based on the determination, the rights request module 110 generates the request inbox 218 for the granter.

At block 306, the generated request inbox is sent to the granter through the eDRM interface. In one implementation, the rights request module 110 sends the request inbox 218 to the granter, where the request inbox 218 may be displayed to the granter on the eDRM interface.

At block 308, the response of the request is obtained from the granter. In one implementation, upon viewing the received request in the request inbox, the granter may respond to the request, i.e., the granter may either grant one or more of the request access rights or the granter may not to grant any access right to the requestor. In one implementation, the rights request module 110 receives the response from the granter. In said implementation, the rights request module 110 may be configured to generate request pending alerts 220, which may be displayed to the granter on the eDRM interface at preset time intervals to intimate the granter of the requests awaiting the granter's response or action.

At block 310, a status alert indicative of the response obtained from the granter is provided to the requestor through the eDRM user interface. In one implementation, when the granter responds to the requests, the rights request module 110 receives such response communicated by the granter. Upon receiving the response, the rights request module 110 provides the response obtained from the granter to the corresponding requestor. In said implementation, the rights request module 110 provides the response in the form of a status alert 222, which is displayed to the granter on the eDRM interface.

Referring to FIG. 4, which illustrates a method 400 for evaluating risk on confidentiality of enterprise information, in accordance with an embodiment of the present subject matter. It will be understood that though the method 400 is explained with reference to evaluating risk associated with one requestor, the same method can also be implemented for evaluating risk associated with a plurality of requestors.

At block 402, each request and response communication between a requestor and a granter are stored in a request database. In one implementation, each request initiated by the requestors and every response obtained from the granters corresponding to the request is stored by the rights request module 110 within the request database 216. The rights request module 110 stores these requests and responses for the purpose of monitoring a request communication process between the requestors and the granters.

At block 404, a risk factor is evaluated for the requestor based on the storing and a plurality of predefined risk evaluation rules. In one implementation, the risk evaluation module 212 within the eDRM server 104 monitors the requests and responses corresponding to the requestor from the request database 216 to evaluate a risk factor for the requestor, based on a plurality of predefined risk evaluation rules 224. Based on the evaluated risk factor, a risk associated with the requestor on confidentiality of the enterprise information is determined. The risk factor may be indicated, for example, in the form of percentage. In one implementation, the risk factor may have a predefined threshold associated therewith.

At block 406, a risk alert is generated based on the evaluated risk alert. The risk alert is indicative of a risk associated with the requestor on the confidentiality of the enterprise information. In one implementation, the risk evaluation module 212 compares the evaluated risk factor with the predefined threshold. If the result of the comparison indicates that the risk factor is above the predefined threshold, the risk evaluation module 212 generates a risk alert 226, thereby informing the enterprise about the risk associated with the requestor. Based on the risk alert 226, the enterprise may take appropriate actions, for example, the enterprise may try to identify the reason behind the risk or the enterprise may also question the request or monitor further activities of the requestor.

Although implementations for methods and systems for obtaining access rights to an encrypted document have been described in language specific to structural features and/or methods, it is to be understood that the appended claims are not necessarily limited to the specific features or methods described. Rather, the specific features and methods are disclosed as exemplary implementations for obtaining access rights to the encrypted document.

I claim:

1. A method for obtaining access rights to an encrypted document using an enterprise digital rights management (eDRM) system, the method comprising:
   receiving a request for obtaining the access rights to the encrypted document from a requestor, through an eDRM interface, wherein the request comprises details of the encrypted document and a selection of access rights to the encrypted document;
   storing the request in a request database, wherein the request database stores a plurality of requests for obtaining the access rights;
   determining the requests pending for authorization corresponding to a granter of the encrypted document amongst the plurality of requests from the request database;
   generating a request inbox corresponding to the granter based on the determination, wherein the request inbox contains the requests pending for the authorization;
   sending the request inbox to the granter through the eDRM interface;
   obtaining from the granter a response to each of the requests pending for the authorization in the request inbox, wherein the response is selected from one of granting the request, denying the request, and granting the request with modification; and
   providing a status alert to the requestor corresponding to the request through the eDRM interface, wherein the status alert is indicative of the response; and
   monitoring the plurality of requests and the response to each of the plurality of requests corresponding to the requestor;
   evaluating a risk factor for the requestor based on the monitoring, wherein the risk factor is associated with a predefined threshold; and
   generating a risk alert when the risk factor is above the predefined threshold, wherein the risk alert is indicative of a risk associated with the requestor.

2. The method as claimed in claim 1 further comprising initiating a request pending alert for the granter on the eDRM interface, wherein the request pending alert is indicative of the request awaiting the response from the granter.

3. The method as claimed in claim 1, wherein the generating is performed at predetermined time intervals.

4. The method as claimed in claim 1, wherein the generating is performed when the granter clicks on a request inbox tab on the eDRM interface.

5. An enterprise digital rights management (eDRM) server comprising:
   a processor; and
   a memory coupled to the processor, the memory comprising:

a rights request module, comprising computer-readable instructions executable by the processor, to:

receive a request for obtaining access rights to an encrypted document from a requestor through an eDRM interface, wherein the request comprises details of the encrypted document and a selection of access rights to the encrypted document;

store the request in a request database, wherein the request database stores a plurality of requests for obtaining the access rights;

determine the requests pending for authorization corresponding to a granter of the encrypted document amongst the plurality of requests from the request database;

generate a request inbox corresponding to the granter based on the determination, wherein the request inbox contains the requests pending for the authorization;

send the request inbox to the granter through the eDRM interface;

obtain from the granter a response to each of the requests pending for the authorization, wherein the response is selected from one of granting the request, denying the request, and granting the request with modification; and provide the response to the requestor corresponding to the request through the eDRM interface; and store the response corresponding to each of the requests in the request database; and a risk evaluation module, comprising the computer-readable instructions executable by the processor, to:

monitor the plurality of requests and the response to each of the plurality of requests corresponding to the requestor;

evaluate a risk factor for the requestor based on the monitoring, wherein the risk factor is associated with a predefined threshold; and generate a risk alert based on the evaluation, when the risk factor is above the predefined threshold, wherein the risk alert is indicative of the risk associated with the requestor.

6. The eDRM server as claimed in claim 5, wherein the rights request module generates the request inbox at predetermined time intervals.

7. The eDRM server as claimed in claim 5, wherein the rights request module generates the request inbox when the granter clicks on a request inbox tab on the eDRM interface.

8. The eDRM server as claimed in claim 5, wherein the rights request module generates a request pending alert for the granter on the eDRM interface, wherein the request pending alert is indicative of the request awaiting the response from the granter.

9. A non-transitory computer-readable medium having embodied thereon a computer program for executing a method comprising:

receiving a request for obtaining access rights to an encrypted document from a requestor, through an enterprise digital rights management (eDRM) interface, wherein the request includes details of the encrypted document and a selection of access rights to the encrypted document;

storing the request in a request database, wherein the request database stores a plurality of requests for obtaining the access rights;

determining the requests pending for authorization corresponding to a granter of the encrypted document amongst the plurality of requests from the request database;

generating a request inbox corresponding to the granter based on the determination, wherein the request inbox contains at least the requests pending for the authorization;

sending the request inbox to the granter through the eDRM interface;

obtaining a response to each of the requests pending for the authorization from the granter, wherein the response is selected from one of granting the request, denying the request, and granting the request with modification; and providing a status alert to the requestor corresponding to the request through the eDRM interface, wherein the status alert is indicative of the response; and evaluating a risk factor for the requestor based in part on data stored in the request database, wherein the data stored in the request database includes the request and the response; and generating a risk alert based on the evaluating.

10. The non-transitory computer-readable medium as claimed in claim 9 further comprising initiating a request pending alert for the granter on the eDRM interface, wherein the request pending alert is indicative of the request awaiting the response from the granter.

11. The non-transitory computer-readable medium as claimed in claim 9, wherein the generating is performed at predetermined time intervals.

12. The non-transitory computer-readable medium as claimed in claim 9, wherein the generating is performed when the granter clicks on a request inbox tab on the eDRM interface.

* * * * *